US010061312B1

(12) United States Patent
Anderson

(10) Patent No.: US 10,061,312 B1
(45) Date of Patent: Aug. 28, 2018

(54) SENSOR MANAGEMENT SYSTEM FOR COMPUTER ASSISTED VEHICLES

(71) Applicant: Intel Corporation, Santa Clara, CA (US)

(72) Inventor: Glen J. Anderson, Beaverton, OR (US)

(73) Assignee: Intel Corporation

( * ) Notice: Subject to any disclaimer, the term of this patent is extended or adjusted under 35 U.S.C. 154(b) by 0 days.

(21) Appl. No.: 15/474,352

(22) Filed: Mar. 30, 2017

(51) Int. Cl.

| | |
|---|---|
| ***G06F 17/00*** | (2006.01) |
| ***B60T 7/12*** | (2006.01) |
| ***G06Q 10/08*** | (2012.01) |
| ***G05D 1/00*** | (2006.01) |
| ***G05D 1/02*** | (2006.01) |
| ***B60S 1/62*** | (2006.01) |

(52) U.S. Cl.
CPC .............. *G05D 1/0055* (2013.01); *B60S 1/62* (2013.01); *G05D 1/0238* (2013.01); *G05D 1/0242* (2013.01); *G05D 1/0255* (2013.01); *G05D 1/0259* (2013.01)

(58) Field of Classification Search
CPC ..... G05D 1/0055; G06F 17/00; F04B 23/021; G01N 15/1434; B60T 7/12; G06Q 10/08
See application file for complete search history.

(56) References Cited

U.S. PATENT DOCUMENTS 9,183,176 B2 * 11/2015 Lee .......................... G06F 17/00
2011/0110794 A1 * 5/2011 Mayleben ............. F04B 23/021 417/53
2016/0370282 A1 * 12/2016 Zhan .................. G01N 15/1434

FOREIGN PATENT DOCUMENTS

CN 203720881 U * 7/2014 ............. G06Q 10/08
EP 1369326 A1 * 12/2003 ................ B60T 7/12

* cited by examiner

*Primary Examiner* — Yuri Kan
(74) *Attorney, Agent, or Firm* — Schwabe, Williamson & Wyatt, P.C.

(57) ABSTRACT

Sensor management systems for computer assisted or autonomous driving vehicles are disclosed herein. A computer assisted or autonomous driving vehicle may be provided with a plurality of sensors and a sensor management system configured to predictively maintain effectiveness of the plurality of sensors, based at least in part on predicted cleaning needs of the sensors, predicted obstruction or destruction events of the sensors, or predicted environmental or operating conditions. In embodiments, the sensor management system may be coupled to a navigation system of the vehicle, and may, in response to a predicted sensor obstruction or destruction event, change a navigation parameter of the vehicle to avoid the event. Alternatively, if the predicted event is determined to be within an acceptable risk tolerance threshold, the sensor management system may follow an original navigational route but implement event avoidance actions. Other embodiments may be disclosed or claimed.

25 Claims, 7 Drawing Sheets

110
130
120
130

SENSOR MANAGEMENT SYSTEM FOR COMPUTER ASSISTED VEHICLES

TECHNICAL FIELD

The present disclosure relates to the field of computer assisted or autonomous driving vehicles, in particular, to a sensor management system for such vehicles, and associated methods or computer readable storage medium.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Self-driving cars, and other robots, have many externally facing sensors to enable safe movement of vehicles among people and other cars. One challenge with having all of these sensors is keeping lenses and other sensor interfaces clean and clear. Mud from roads, bird droppings, a splash from a bus driving by, or fogging can suddenly block one or more sensors. Even an automatic cleaning regime may very likely obstruct a sensor, at least momentarily, and thereby possibly obstruct the sensor at a key point in time. Leaving a sensor partially soiled until stopping has issues, and simply stopping a self-driving car when a sensor is not operative may be necessary but is not desirable.

The high level of reliability required in self-driving cars requires that very few errors be made due to sensor soiling or obstruction.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
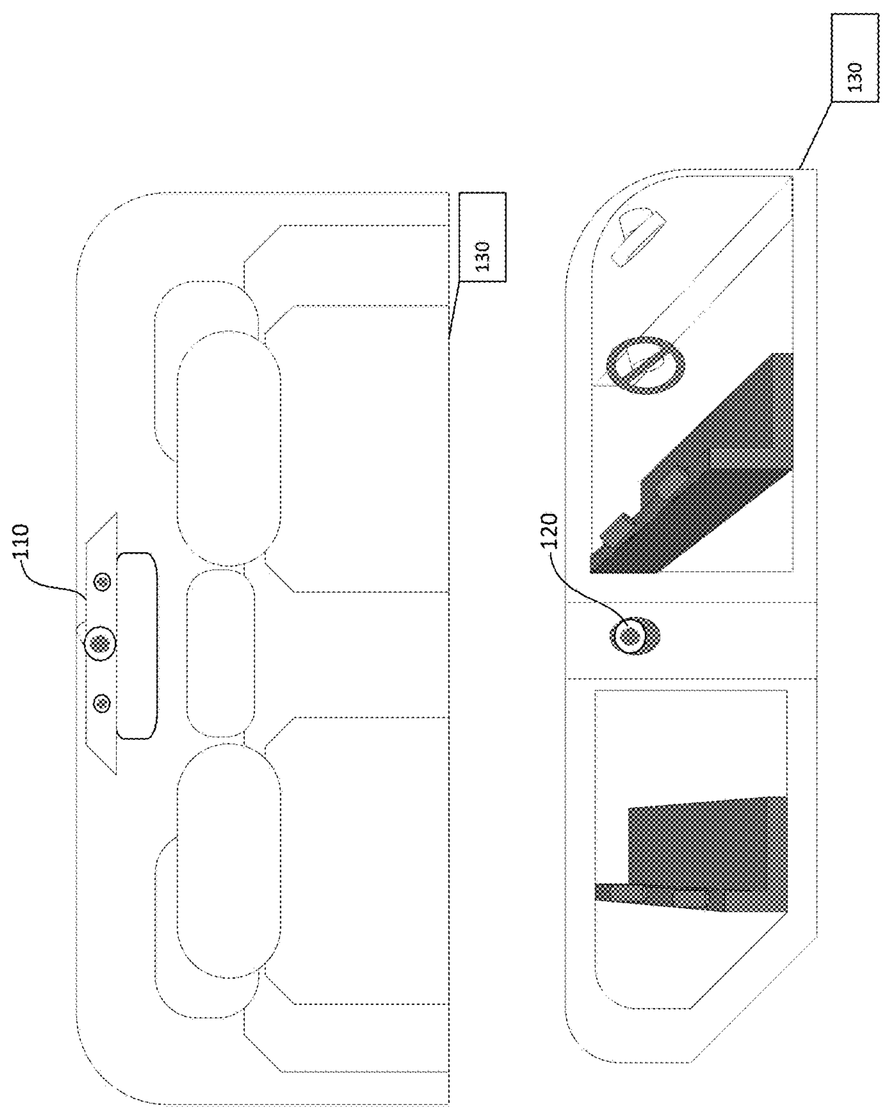
FIG. 1 illustrates exemplary cameras provided on a self-driving vehicle.

A computer assisted or autonomous driving vehicle may be provided with a plurality of sensors and a sensor management system may be coupled to the plurality of sensors. In embodiments, the sensor management system in the vehicle may predictively maintain effectiveness of the plurality of sensors, based at least in part on predicted cleaning needs of the sensors, predicted obstruction or destruction events of the sensors, or predicted environmental or operating conditions. In embodiments, the sensor management system may be further coupled to a navigation system of the vehicle, and the sensor management system, in response to a predicted obstruction or destruction event of the sensors, may, if the event is determined to be above a defined threshold of risk, change a navigation parameter of the vehicle to avoid the event. Alternatively, if the predicted obstruction or destruction event is determined to be within an acceptable risk tolerance threshold, the sensor management system may follow an original navigational route as planned, but implement event avoidance actions to protect the potentially affected sensors.

In the description to follow, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous. For the purpose of this application, including the claims, the terms "computer assisted vehicle," and "autonomous driving vehicles" may be considered synonymous.

As used hereinafter, including the claims, the term "module" may refer to, be part of, or include an Application Specific Integrated Circuit (ASIC), an electronic circuit, a programmable combinational logic circuit (such as field programmable gate array (FPGA)), a processor (shared, dedicated, or group) and/or memory (shared, dedicated, or group) that execute one or more software or firmware programs generated from a plurality of programming instructions, and/or other suitable components that provide the described functionality.

As used hereinafter, including the claims, the terms "sensor management system" and "navigation system" may refer to, be part of, or include one or more Application Specific Integrated Circuits (ASIC), electronic circuits, programmable combinational logic circuits (such as field programmable gate arrays (FPGA)) programmed with logic to perform operations described herein, a processor (shared, dedicated, or group) and/or memory (shared, dedicated, or group) that execute one or more software or firmware programs generated from a plurality of programming instructions with logic to perform operations described herein, and/or other suitable components that provide the described functionality.

Referring now to FIG. 1, various examples of sensors provided on a computer-assisted vehicle are depicted. As shown in the upper image, three forward looking cameras 110 are provided in a module that sits above the rear-view mirror, just inside the top of the windshield. In the lower image of FIG. 1 a camera 120 is shown mounted on the frame of the vehicle in the vertical post between the front and rear doors on the passenger side. In embodiments, sensors such as these are managed by sensor management systems 130 according to the present disclosure in various ways.

Figure 2A:
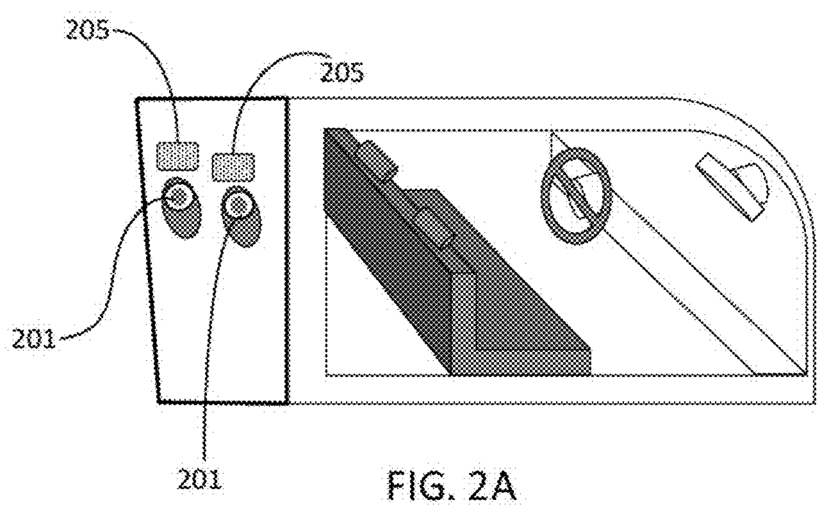
FIG. 2A depicts a set of two redundant sensors as uncovered in accordance with various embodiments.
Figure 2B:
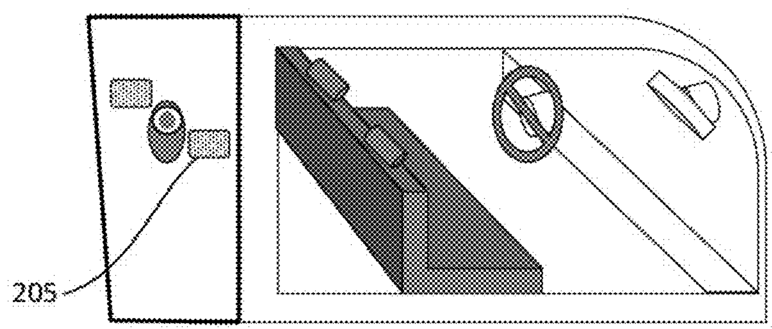
FIG. 2B depicts the set of redundant sensors of FIG. 2A, with the right one covered, in accordance with various embodiments.

Referring now to FIGS. 2A and 2B, a pair of redundant sensors 201 are shown as mounted on a vertical post of a computer assisted vehicle, in similar fashion as the single sensor shown in the lower image of FIG. 1. In embodiments, sensors 210 may be provided with mechanical covers 205 that, when actuated, may cover a sensor provided in or on a vehicle so as to shield it from external objects or forces, such as rain, mud, splashes, etc. Example covers are shown in FIG. 2, as next described. Because within a set of redundant sensors each sensor acquires essentially the same signal or information, such as, as in the case depicted in FIGS. 2A and 2B, images of whatever vehicles or other objects are positioned to the right side of the vehicle, one of the redundant sensors may be covered to protect it while the other may be left uncovered. The sensor remaining uncovered may thus continue to acquire its signal, which may be needed to navigate the vehicle. FIGS. 2A and 2B depict[[s]] a set of two redundant image sensors. FIG. 2A illustrates both redundant sensors as uncovered, and FIG. 2B illustrates the right one (i.e., the one closest to the front of the vehicle) as covered.

Figure 3:
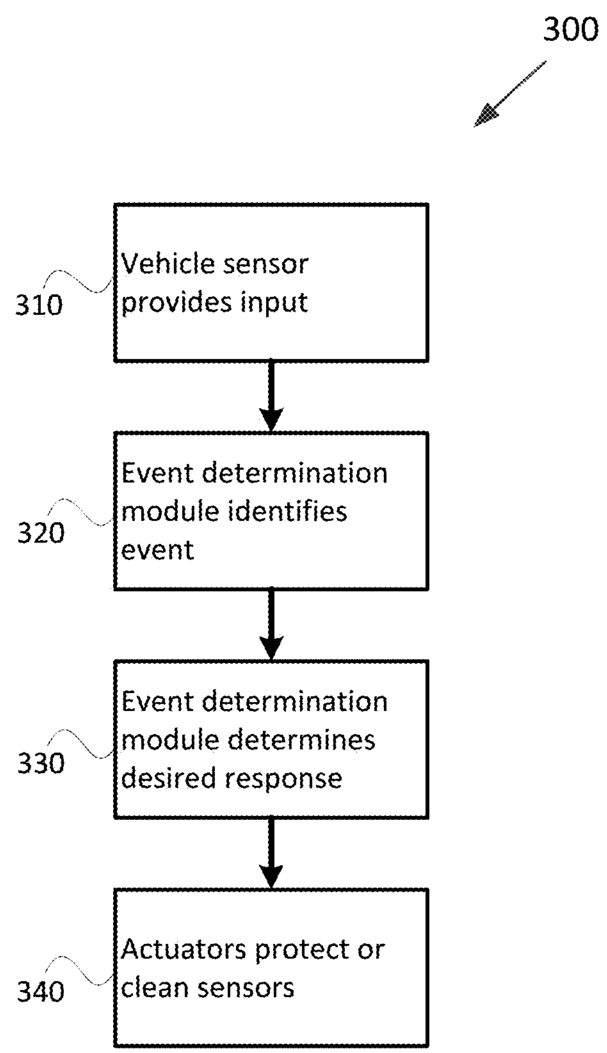
FIG. 3 illustrates an overview of the operational flow of a process for real-time identification of, and response to, sensor events, in accordance with various embodiments.
Figure 4:
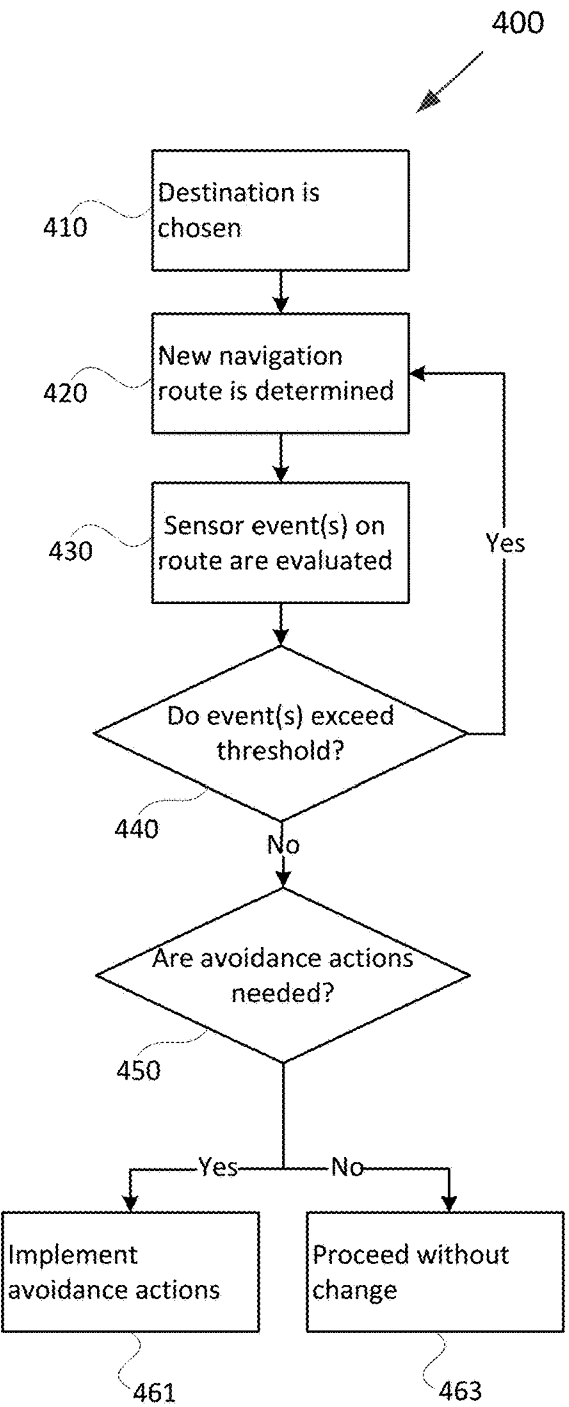
FIG. 4 illustrates an overview of the operational flow of a process for identification and handling of sensor events on navigational routes of a vehicle, in accordance with various embodiments.

FIGS. 3 and 4, next described, illustrate overviews of operational flow for identification of, and response to, sensor events, in accordance with various embodiments. FIG. 3 illustrates a real-time or imminent event identification process, and FIG. 4 illustrates operational flow for a process of identification of and response to potential events predicted to occur during travel over a proposed route currently being charted by a vehicle's navigation system.

Figure 5:
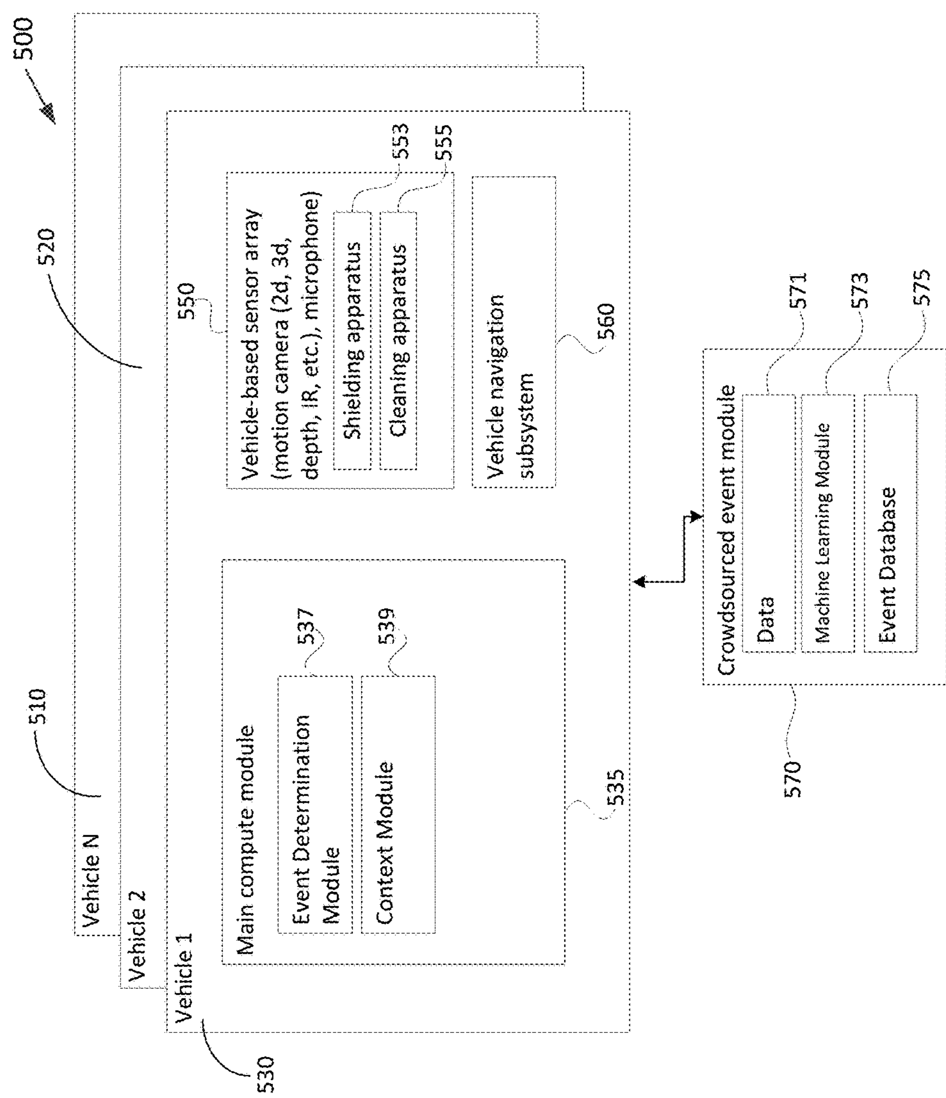
FIG. 5 illustrates a sensor management system, in accordance with various embodiments.

Referring now to FIG. 3, an overview of operational flow for processes of identifying a sensor event and responding to the identified sensor event is illustrated. As illustrated, processes 300 may include operations performed at blocks 310-340. The operations at blocks 310-340 may be performed e.g., by the various elements of a sensor management system 500, such as is illustrated in FIG. 5, described below.

Process 300 may begin at block 310. At block 310 a vehicle sensor may provide input to a sensor management system to which the sensor is coupled. Based on the input from the sensor, e.g., a camera whose images begin to be fuzzy, such as occurs in a rainstorm, snowstorm or fog condition, process 300 may proceed to block 320, where an event determination module of a sensor management system, such as event determination module 537 of FIG. 5, may determine that an obstructive or destructive sensor event has begun, such as weather conditions that at least would occlude, and may even damage, a sensor, or that a cleaning need as arisen for a sensor. Based on this determination, process 300 may proceed to block 330, where the event determination module of the sensor management system may determine an appropriate response. In embodiments, the response determined at block 330 may depend upon whether affected sensors have already become soiled or occluded, and thus, using the example illustrated in FIG. 2, a camera or other image acquisition sensor may need protection from imminent weather, or may already have been occluded by current weather conditions. In the former case all that is needed is protection, and in the latter case both protection now (from further damage or soiling) and subsequent cleaning may be needed. Process 300 may proceed form block 330 to block 340, where the response determined at block 330 may be implemented, e.g., the affected sensors protected or cleaned. For example, actuators such as covers 205 may be used to protect sensors. In embodiments, following protection, the sensors involved may also be cleaned, depending upon how early the weather event was identified, and thus how soiled they are.

Referring now to FIG. 4, operational flow for a process 400 of identification of and response to potential events predicted to occur during travel over a proposed route currently being charted by a vehicle's navigation system is illustrated. The process of FIG. 4 may be implemented in embodiments where a sensor management system of a computer assisted or autonomous driving vehicle is coupled to the vehicle's navigation system. In such embodiments, sensor management may be included in navigational route planning, and potential sensor events predicted and dealt with.

As illustrated in FIG. 4, process 400 may include operations performed at blocks 410-463. The operations at blocks 410-463 may be performed e.g., by the various elements of a sensor management system 500, integrated with a vehicle navigation subsystem 560, such as is illustrated in FIG. 5, described below.

Process 400 may begin at block 410. At block 410, a destination is chosen for a vehicle, such as by vehicle navigation subsystem 560 in FIG. 5. Based on this destination, from block 410 process 400 may proceed to block 420, where a new navigation route is determined. This may also be performed by vehicle navigation subsystem 560 in FIG. 5. From block 420 process 400 may proceed to block 430, where predicted sensor events on the route determined at block 420 are evaluated. In embodiments, the process at block 430 may be performed by event determination module 537 of sensor management system 500 of FIG. 5.

From block 430, process 400 may proceed to block 440, where it may be determined if the sensor events on the route identified at block 430 exceed a risk threshold (due to e.g., uncleanliness, obstructive and/or destructive event. If Yes, and thus the predicted events too risky for the vehicle to proceed, process 400 may effectively terminate consideration of the then determined route, and return to block 420, where a new navigation route may be determined. Following block 420, process 400 may proceed once again to block 430, where sensor events on the newly chosen navigation route may be evaluated. Process 400 may continue in a loop including blocks 440, 420, and 430 until a No is the result of the query at block 440. Upon a No result at block 440, process 400 may proceed to block 450, where it may be determined whether avoidance actions are needed to deal with the predicted sensor events on the currently planned navigation route. If Yes at block 450, process 400 may proceed to block 461, and implement avoidance actions, to protect sensors from the event. These actions may include, for example, covering a sensor as shown in FIGS. 2A and 2B, cleaning affected sensors following the event, reduce vehicle speed, swerve to avoid a puddle, and other actions to avoid sensors becoming obstructed. If, however, the result of the query at block 450 is No, and no avoidance actions are needed, then process 400 may proceed to block 463, and the vehicle may proceed along the navigation route without further action by the sensor management system. At either of block 461 and block 463, process 400 may terminate.

Referring now to FIG. 5, wherein a system diagram of a sensor management system 500 provided in a vehicle suitable for practicing the present disclosure, in accordance with various embodiments, is illustrated. As shown, a sensor management system 500 may be provided in one or more vehicles 510, 520 and 530. In embodiments, sensor management system 500 may include a main compute module 535, which may include an event determination module 537 to recognize an obstructive or destructive event of a sensor, and a context module 539. In embodiments, event determination module may use data provided by context module 539 to determine sensor events. In embodiments, context module 539 may include a wide variety of contextual information, such as location, planned location, weather conditions at current or future location, urgency of the trip presence of other vehicles, animals or people, detected hazards and threats and level of driving assistance to the vehicle (e.g., self-driving vehicle or assisted driving).

Continuing with reference to FIG. 5, sensor management system may be coupled to a vehicle-based sensor array, which may include (sensor) shielding apparatus 553, and (sensor) cleaning apparatus 555, each of which may be used to implement maintenance of the sensors, as described in connection with FIGS. 3 and 4. In embodiments, sensor management system 500 may further be coupled to, or integrated with, vehicle navigation system 560, as described in connection with FIG. 4.

Finally, in embodiments, sensor management system 500 in a vehicle may be further coupled to crowdsourced event module 570, which may store data 571 regarding sensor events, or potential sensor events, and include a machine learning module 573 and an event database 575. In embodiments, machine learning module 573 may use known methods of machine learning to improve the prediction and identification of sensor events based on data from the vehicle and from other vehicles which it receives. For example, when multiple vehicles encounter sensor obstructions at a given intersection, a sensor management system may route its vehicle around that intersection. In embodiments, using data 571, as processed by machine learning module 573, an event database 575 may be generated, to store descriptions of individual events. Event database 575 may include records for each sensor event, and may store in each event record a description of the event, the location of the event, the hazard level of the event to various sensor locations on the vehicle, the hazard level to specific models or types of vehicle, the hazard level in relation to one or more defined thresholds (so as to be used at block 440 of process 400, described with reference to FIG. 4), the effect of weather patterns on individual events, etc. In embodiments, crowdsourced event module 570 may be provided within a vehicle, such as vehicles 510, 520 or 530, or it may be provided in the cloud, and be accessed by sensor management system through data communication networks.

Figure 6:
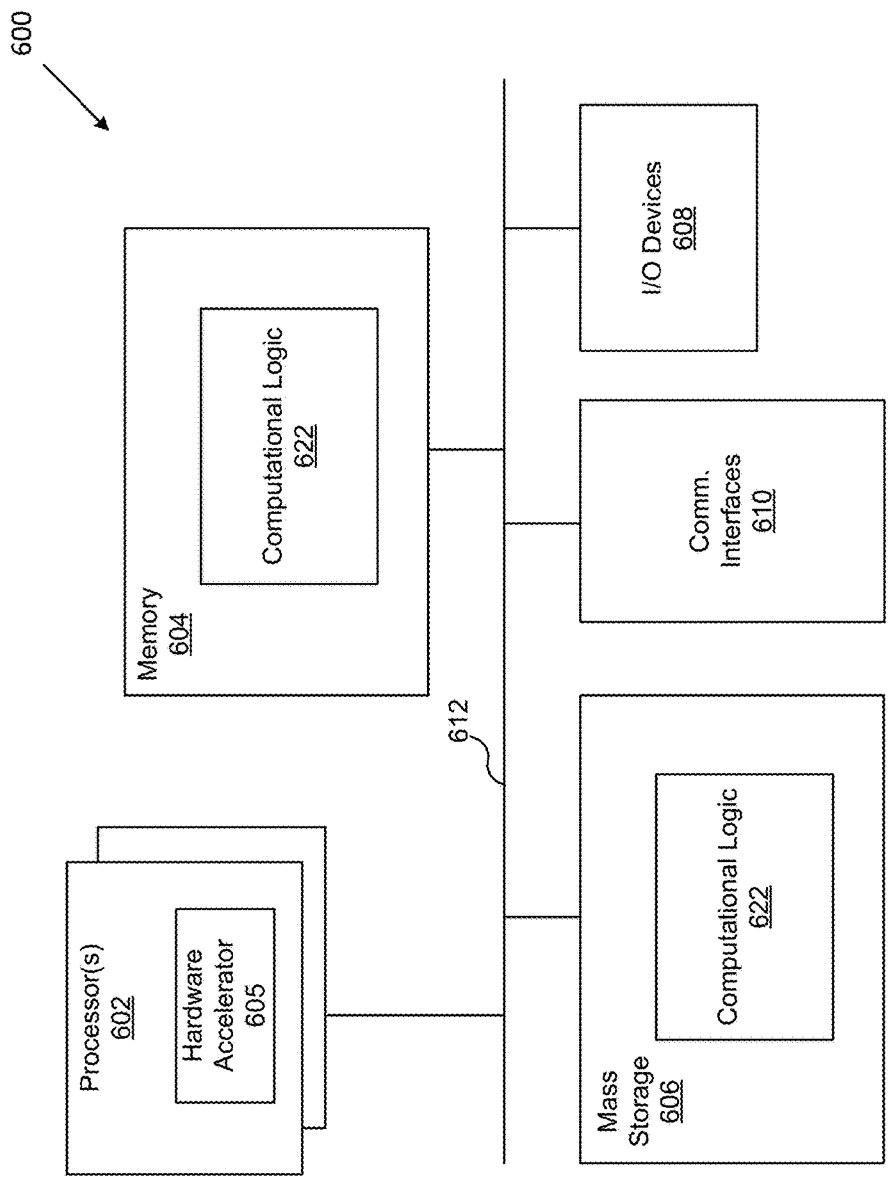
FIG. 6 illustrates a block diagram of a computer device suitable for practicing the present disclosure, in accordance with various embodiments.

Referring now to FIG. 6, wherein a block diagram of a computer device suitable for practicing the present disclosure, in accordance with various embodiments, is illustrated. As shown, computer device 600 may include one or more processors 602, memory controller 603, and system memory 604. Each processor 602 may include one or more processor cores and/or hardware accelerator 605. An example of hardware accelerator 605 may include, but is not limited to, programmed field programmable gate arrays (FPGA). Memory controller 603 may be any one of a number of memory controllers known in the art. System memory 604 may include any known volatile or non-volatile memory.

Additionally, computer device 600 may include mass storage device(s) 606 (such as solid state drives), input/output device interface 608 (to interface with various input/output devices, such as, mouse, cursor control, display device (including touch sensitive screen), and so forth) and communication interfaces 610 (such as network interface cards, modems and so forth). In embodiments, communication interfaces 610 may support wired or wireless communication, including near field communication. The elements may be coupled to each other via system bus 612, which may represent one or more buses. In the case of multiple buses, they may be bridged by one or more bus bridges (not shown).

Each of these elements may perform its conventional functions known in the art. In particular, system memory 604 and mass storage device(s) 606 may be employed to store a working copy and a permanent copy of the executable code of the programming instructions of an operating system, one or more applications, event determination module 537, context module 539, vehicle navigation system 560, event determination module 537, context module 539, crowdsourced event module 570, and/or machine learning module 573, collectively referred to as computing logic 622. Main compute module 535 et al may be configured to practice (aspects of) processes 300 and 400 of FIGS. 3 and 4, respectively. The programming instructions may comprise assembler instructions supported by processor(s) 602 or high-level languages, such as, for example, C, that can be compiled into such instructions. In embodiments, some of computing logic may be implemented in hardware accelerator 605. In embodiments, some of the aspects of event determination module 537, context module 539, vehicle navigation system 560, event determination module 537, context module 539, crowdsourced event module 570, and/or machine learning module 573, may be implemented with hardware accelerator 605.

The permanent copy of the executable code of the programming instructions or the bit streams for configuring hardware accelerator 605 may be placed into permanent mass storage device(s) 606 in the factory, or in the field, through, for example, a distribution medium (not shown), such as a compact disc (CD), or through communication interface 610 (from a distribution server (not shown)).

The number, capability and/or capacity of these elements 610-612 may vary, depending on the intended use of example computer device 600, e.g., whether example computer device 600 is a smartphone, tablet, ultrabook, a laptop, a server, a set-top box, a game console, a camera, and so forth. The constitutions of these elements 610-612 are otherwise known, and accordingly will not be further described.

Figure 7:
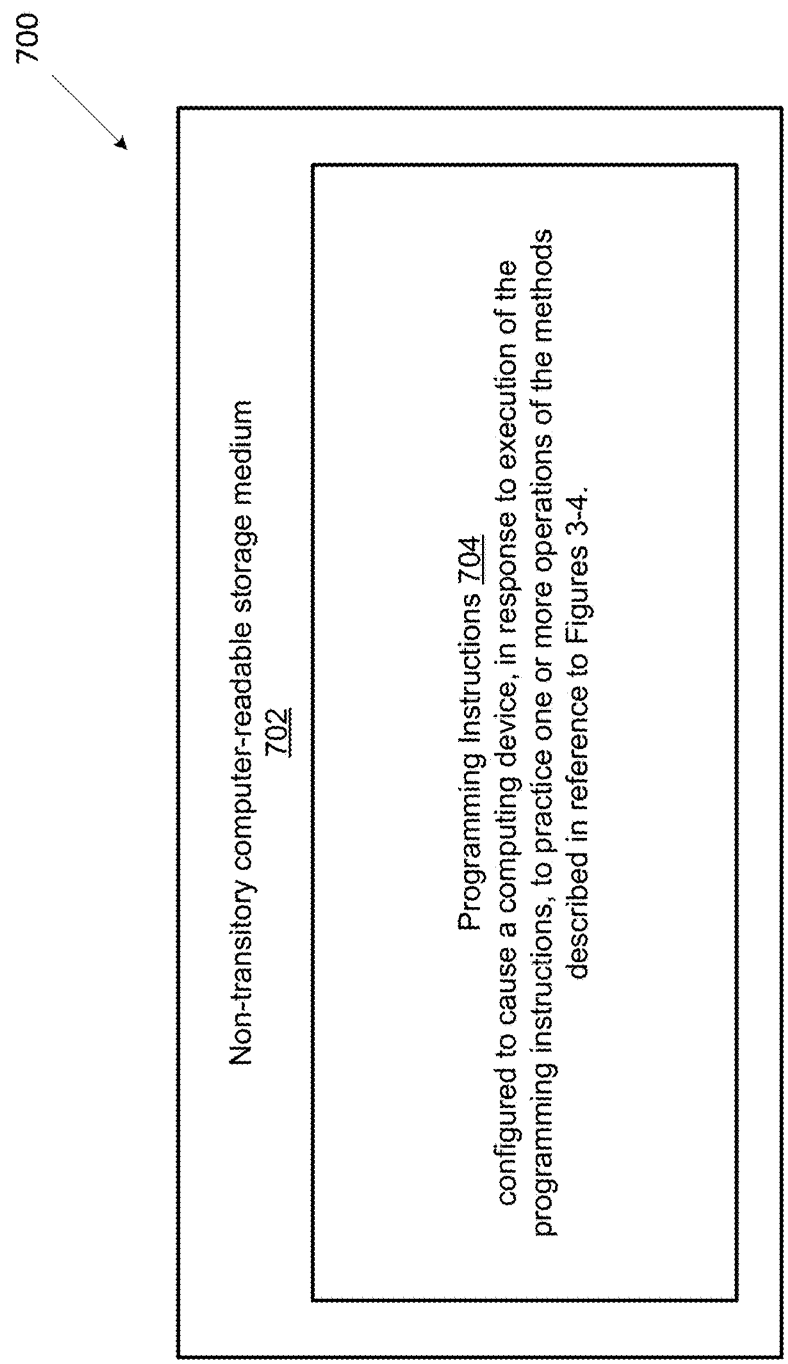
FIG. 7 illustrates an example computer-readable storage medium having instructions configured to practice aspects of the processes of FIGS. 3 and 4, in accordance with various embodiments.

FIG. 7 illustrates an example computer-readable storage medium having instructions (or bit streams) configured to implement all (or portion of) event determination module 537, context module 539, vehicle navigation system 560, event determination module 537, context module 539, crowdsourced event module 570, and/or machine learning module 573, and/or practice (aspects of) processes 300 and 400 of FIGS. 3 and 4, respectively, earlier described, in accordance with various embodiments. As illustrated, computer-readable storage medium 702 may include the executable code of a number of programming instructions or bit streams 704. Executable code of programming instructions (or bit streams) 704 may be configured to enable a device, e.g., computer device 600, in response to execution of the executable code/programming instructions (or operation of an encoded hardware accelerator 605), to perform (aspects of) processes 300 and 400 of FIGS. 3 and 4, respectively. In alternate embodiments, executable code/programming instructions/bit streams 704 may be disposed on multiple non-transitory computer-readable storage medium 702 instead. In embodiments, computer-readable storage medium 702 may be non-transitory. In still other embodiments, executable code/programming instructions 704 may be encoded in transitory computer readable medium, such as signals.

Referring back to FIG. 6, for one embodiment, at least one of processors 602 may be packaged together with a computer-readable storage medium having some or all of computing logic 622 (in lieu of storing in system memory 604 and/or mass storage device 606) configured to practice all or selected ones of the operations earlier described with references to FIGS. 3 and 4. For one embodiment, at least one of processors 602 may be packaged together with a computer-readable storage medium having some or all of computing logic 622 to form a System in Package (SiP). For one embodiment, at least one of processors 602 may be integrated on the same die with a computer-readable storage medium having some or all of computing logic 622. For one embodiment, at least one of processors 602 may be packaged together with a computer-readable storage medium having some or all of computing logic 622 to form a System on Chip (SoC). For at least one embodiment, the SoC may be utilized in, e.g., but not limited to, a hybrid computing tablet/laptop.

Illustrative examples of the technologies disclosed herein are provided below. An embodiment of the technologies may include any one or more, and any combination of, the examples described below.

Example 1 may include a computer assisted or autonomous driving vehicle, comprising: a plurality of sensors; and a sensor management system for use in the vehicle, coupled to the plurality of sensors, to predictively maintain effectiveness of the plurality of sensors, based at least in part on predicted cleaning needs of the sensors, predicted obstruction or destruction events of the sensors, or predicted environmental or operating conditions.

Example 2 may include the vehicle of example 1 and/or some other examples herein, wherein the sensor management system is further coupled to a navigation system of the vehicle, and the sensor management system, in response to a predicted obstruction or destruction event of the sensors, is to further change a navigation parameter of the vehicle to avoid the event.

Example 3 may include the vehicle of example 2 and/or some other examples herein, wherein change a navigation parameter of the vehicle includes one selected from change route, change street, change time of travel, reduce or increase speed, swerve, change lanes, or stop the vehicle in a safe place.

Example 4 may include the vehicle of examples 1-3 and/or some other examples herein, wherein the sensor management system, in response to a predicted obstruction or destruction event of a sensor, is to take an action to shield the sensor during the event.

Example 5 may include the vehicle of example 4 and/or some other examples herein, wherein shield a sensor includes shield a surface through which the sensor receives a signal.

Example 6 may include the vehicle of example 4 and/or some other examples herein, wherein take an action to shield the sensor includes actuate a mechanical device to cover the sensor.

Example 7 may include the vehicle of example 4 and/or some other examples herein, wherein the plurality of sensors includes one or more sets of redundant sensors, and as to each set of redundant sensors: the sensor management system is to further clean or caused to be cleansed one of the redundant sensors when it determines that another of the redundant sensors can perform required sensing tasks.

Example 8 may include the vehicle of example 7 and/or some other examples herein, wherein clean or caused to be cleansed one of the redundant sensors includes clean or caused to be cleansed a surface through which the one redundant sensor receives a signal.

Example 9 may include the vehicle of examples 1-3 and/or some other examples herein, wherein the plurality of sensors includes one selected from a 2D camera, a 3D camera, a depth camera, a red-green-blue camera, an infrared camera, a passive infrared camera, a microphone, a capacitance sensor, an ultrasonic sensor, a Reed switch or a Hall switch.

Example 10 may include the vehicle of examples 1-3 and/or some other examples herein, wherein the sensor management system in the vehicle comprises: a context module to obtain information regarding a planned trip of the vehicle; and an event determination module, coupled to the context module, to receive the information and predict an obstruction or destruction event of the sensors based on the information.

Example 11 may include the vehicle of example 10 and/or some other examples herein, wherein the information regarding a planned trip of the vehicle includes one selected from current location, planned destination, weather conditions, urgency of the trip, presence of other vehicles or people, sensor readings, or whether during the trip the vehicle is computer assisted or autonomously driving.

Example 12 may include the vehicle of examples 1-3 and/or some other examples herein, wherein the sensor management system in the vehicle includes a machine learning module to generate an events database based, at least in part, on past predicted events, and to use, at least in part, data stored in the events database to predict an obstruction or destruction event of the sensors.

Example 13 may include the vehicle of example 12 and/or some other examples herein, wherein a record for each event stored in the events database includes one or more of: a description of the event, a geographical location of the event, the sensor or sensors affected by the event and a level of hazard to each affected sensor, an area on the vehicle subject to the event, action taken in response to the event, or effect of action taken in response to the event.

Example 14 may include a computer assisted or autonomous driving vehicle, comprising: a plurality of sensors on the vehicle; and a sensor management system in the vehicle, coupled to the plurality of sensors, based at least in part on identified obstruction or destruction events of the sensors, and a receiver to receive an instruction from a sender external to the vehicle that identifies an obstruction or destruction event of the sensors.

Example 15 may include the vehicle of example 14 and/or some other examples herein, wherein the sensor management system is further coupled to a navigation system of the vehicle, and the sensor management system, in response to receiving an instruction identifying an obstruction or destruction event of the sensors, is to further change a navigation parameter of the vehicle to avoid the event.

Example 16 may include the vehicle of example 15 and/or some other examples herein, wherein change a navigation parameter of the vehicle includes one selected from change route, change street, change time of travel, reduce or increase speed, swerve, change lanes, and stop the vehicle in a safe place.

Example 17 may include the vehicle of examples 14-16, and/or some other examples herein, wherein the sensor management system, in response to receiving an instruction identifying an obstruction or destruction event of a sensor, is to take an action to shield the sensor during the event.

Example 18 may include the vehicle of example 17 and/or some other examples herein, wherein shield a sensor includes shield a surface through which the sensor receives a signal.

Example 19 may include the vehicle of example 17 and/or some other examples herein, wherein take an action to shield the sensor includes actuate a mechanical device to cover the sensor.

Example 20 may include the vehicle of examples 14-16, and/or some other examples herein, wherein the instruction is received from another vehicle, or from a cloud computing environment.

Example 21 may include the vehicle of examples 14-16, and/or some other examples herein, wherein the plurality of sensors includes one or more sets of redundant sensors, and as to each set of redundant sensors: the sensor management system in the vehicle is to further clean one of the redundant sensors, or to clean a surface through which the sensor receives a signal, when it determines that another of the redundant sensors can perform required sensing tasks.

Example 22 may include the vehicle of examples 14-16, and/or some other examples herein, wherein the one or more sensors includes one selected from a 2D camera, a 3D camera, a depth camera, a red-green-blue camera, an infrared camera, a passive infrared camera, a microphone, a capacitance sensor, an ultrasonic sensor, a Reed switch or a Hall switch.

Example 23 may include one or more non-transitory computer-readable media comprising instructions that cause a sensor management system in a vehicle, coupled to a plurality of sensors on the vehicle, in response to execution of the instructions by the sensor management system, to: predictively maintain effectiveness of the plurality of sensors, based at least in part on predicted cleaning needs of the sensors, predicted obstruction or destruction events of the sensors, or predicted environmental or operating conditions.

Example 24 may include the one or more non-transitory computer-readable media of example 23, and/or some other examples herein, wherein the sensor management system in the vehicle is further coupled to a navigation system of the vehicle, and wherein the sensor management system, in response to a predicted obstruction or destruction event of the sensors, is further caused to change a navigation parameter of the vehicle to avoid the event.

Example 25 may include the one or more non-transitory computer-readable media of example 24, and/or some other examples herein, wherein change a navigation parameter of the vehicle includes one selected from change route, change street, change time of travel, reduce or increase speed, swerve, change lanes, and stop the vehicle in a safe place.

Example 26 may include the one or more non-transitory computer-readable media of examples 23-25, and/or some other examples herein, wherein the plurality of sensors includes one or more sets of redundant sensors, and wherein the sensor management system is further caused to, as to each set of redundant sensors: clean one of the redundant sensors when it determines that another of the redundant sensors can perform required sensing tasks.

Example 27 may include the one or more non-transitory computer-readable media of examples 23-25, and/or some other examples herein, wherein predicted obstruction or destruction events of the sensors include imminent sensor destruction or obstruction events, or future destruction or obstruction events of the sensors.

Example 28 may include the one or more non-transitory computer-readable media of examples 23-25, and/or some other examples herein, wherein the plurality of sensors includes one selected from a 2D camera, a 3D camera, a depth camera, a red-green-blue camera, an infrared camera, a passive infrared camera, a microphone, a capacitance sensor, an ultrasonic sensor, a Reed switch or a Hall switch.

Example 29 may include the one or more non-transitory computer-readable media of examples 23-25, and/or some other examples herein, wherein the sensor management system in the vehicle, in response to a predicted obstruction or destruction event of the sensors, is further caused to take an action to shield the sensor during the event.

Example 30 may include the one or more non-transitory computer-readable media of example 29, and/or some other examples herein, wherein shield a sensor includes shield a surface through which the sensor receives a signal.

Example 31 may include the one or more non-transitory computer-readable media of example 29, and/or some other examples herein, wherein take an action to shield the sensor includes actuate a mechanical device to cover the sensor.

Example 32 may include the one or more non-transitory computer-readable media of examples 23-25, and/or some other examples herein, wherein the sensor management system is further caused to generate an events database based, at least in part, on past predicted events, and to use, at least in part, data stored in the events database to predict an obstruction or destruction event of the sensors.

Example 33 may include the one or more non-transitory computer-readable media of example 32, and/or some other examples herein, wherein a record for each event stored in the events database includes one or more of: a description of the event, a geographical location of the event, the sensor or sensors affected by the event and a level of hazard to each affected sensor, an area on the vehicle subject to the event, action taken in response to the event, or effect of action taken in response to the event.

Example 34 may include an apparatus for computing provided in a vehicle, coupled to a plurality of sensors on the vehicle, comprising: means for predictively maintaining effectiveness of the plurality of sensors, based at least in part on predicted cleaning needs of the sensors, predicted obstruction or destruction events of the sensors, or predicted environmental or operating conditions.

Example 35 may include the apparatus for computing of example 34, and/or some other examples herein, wherein the apparatus for computing is further coupled to a navigation system of the vehicle, and further comprises: means for changing a navigation parameter of the vehicle to avoid an event, in response to a predicted obstruction or destruction event of the sensors.

Example 36 may include the apparatus for computing of example 35, and/or some other examples herein, wherein change a navigation parameter of the vehicle includes one selected from change route, change street, change time of travel, reduce or increase speed, swerve, change lanes, or stop the vehicle in a safe place.

Example 37 may include the apparatus for computing of any one of examples 34-36, and/or some other examples herein, wherein predictively maintaining effectiveness of the plurality of sensors, in response to a predicted obstruction or destruction event of a sensor, further includes means for taking an action to shield the sensor during the event.

Example 38 may include the apparatus for computing of example 37, and/or some other examples herein, wherein taking an action to shield a sensor includes taking an action to shield a surface through which the sensor receives a signal.

Example 39 may include the apparatus for computing of claim 37, and/or some other examples herein, wherein taking an action to shield the sensor further includes means for actuating a mechanical device to cover the sensor.

Example 40 may include the apparatus for computing of example 37, and/or some other examples herein, wherein the plurality of sensors includes one or more sets of redundant sensors, the apparatus further comprising as to each set of redundant sensors: means to clean or cause to be cleansed one of the redundant sensors when it determines that another of the redundant sensors can perform required sensing tasks.

Example 41 may include the apparatus for computing of example 40, and/or some other examples herein, wherein cleaning or causing to be cleansed one of the redundant sensors further includes means for cleaning or causing to be cleansed a surface through which the one redundant sensor receives a signal.

Example 42 may include the apparatus for computing of any one of examples 34-36, and/or some other examples herein, wherein the plurality of sensors includes one selected from a 2D camera, a 3D camera, a depth camera, a red-green-blue camera, an infrared camera, a passive infrared camera, a microphone, a capacitance sensor, an ultrasonic sensor, a Reed switch or a Hall switch.

Example 43 may include the apparatus for computing of any one of examples 34-36, and/or some other examples herein, further comprising: means for obtaining information regarding a planned trip of the vehicle; and means, coupled to the means for obtaining information, for receiving the information and predicting an obstruction or destruction event of the sensors based on the information.

Example 44 may include the apparatus for computing of example 43, and/or some other examples herein, wherein the information regarding a planned trip of the vehicle includes one selected from current location, planned destination, weather conditions, urgency of the trip, presence of other vehicles or people, sensor readings, or whether during the trip the vehicle is computer assisted or autonomously driving.

Example 45 may include the apparatus for computing of any one of examples 34-36, and/or some other examples herein, further comprising means for generating an events database based, at least in part, on past predicted events, and for using, at least in part, data stored in the events database for predicting an obstruction or destruction event of the sensors.

Example 46 may include the apparatus for computing of example 45, and/or some other examples herein, wherein a record for each event stored in the events database includes one or more of: a description of the event, a geographical location of the event, the sensor or sensors affected by the event and a level of hazard to each affected sensor, an area on the vehicle subject to the event, action taken in response to the event, or effect of action taken in response to the event.

Example 47 may include a method of maintaining the effectiveness of a plurality of sensors provided in a computer assisted or autonomous driving vehicle, comprising: predicting, by a computing device comprising a hardware accelerator, coupled to a plurality of sensors in a computer assisted or autonomous driving vehicle, cleaning needs of the sensors, obstruction or destruction events of the sensors, or environmental or operating conditions; and maintaining the effectiveness of the plurality of sensors, based at least in part on the predicted cleaning needs of the sensors, predicted obstruction or destruction events of the sensors, or predicted environmental or operating conditions.

Example 48 may include the method of example 47, and/or some other examples herein, further comprising: coupling the computing device to a navigation system of the vehicle; and in response to a predicted obstruction or destruction event of the sensors by the computing device, changing a navigation parameter of the vehicle to avoid the event.

Example 49 may include the method of example 48, and/or some other examples herein, wherein changing a navigation parameter of the vehicle includes one selected from change route, change street, change time of travel, reduce or increase speed, swerve, change lanes, or stop the vehicle in a safe place.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. A computer assisted or autonomous driving vehicle, comprising:

a plurality of sensors; and a sensor management system for use in the vehicle, coupled to the plurality of sensors to predictively maintain effectiveness of the plurality of sensors, based at least in part on predicted cleaning needs of the sensors, predicted obstruction or destruction events of the sensors, or predicted environmental or operating conditions.

2. The vehicle of claim 1, wherein the sensor management system is further coupled to a navigation system of the vehicle, and the sensor management system, in response to a predicted obstruction or destruction event of the sensors, is to further change a navigation parameter of the vehicle to avoid the event.

3. The vehicle of claim 2, wherein change a navigation parameter of the vehicle includes one selected from change route, change street, change time of travel, reduce or increase speed, swerve, change lanes, or stop the vehicle in a safe place.

4. The vehicle of claim 1, wherein the sensor management system, in response to a predicted obstruction or destruction event of a sensor, is to take an action to shield the sensor during the event.

5. The vehicle of claim 4, wherein shield a sensor includes shield a surface through which the sensor receives a signal.

6. The vehicle of claim 4, wherein take an action to shield the sensor includes actuate a mechanical device to cover the sensor.

7. The vehicle of claim 1, wherein the plurality of sensors includes one or more sets of redundant sensors, and as to each set of redundant sensors:

the sensor management system is to further clean or caused to be cleansed one of the redundant sensors when it determines that another of the redundant sensors can perform required sensing tasks.

8. The vehicle of claim 7, wherein clean or caused to be cleansed one of the redundant sensors includes clean or caused to be cleansed a surface through which the one redundant sensor receives a signal.

9. The vehicle of claim 1, wherein the plurality of sensors includes one selected from a 2D camera, a 3D camera, a depth camera, a red-green-blue camera, an infrared camera, a passive infrared camera, a microphone, a capacitance sensor, an ultrasonic sensor, a Reed switch or a Hall switch.

10. The vehicle of claim 1, wherein the sensor management system in the vehicle comprises:

a processor, the processor to include:

a context module to obtain information regarding a planned trip of the vehicle; and an event determination module, coupled to the context module, to receive the information and predict an obstruction or destruction event of the sensors based on the information.

11. The vehicle of claim 10, wherein the information regarding a planned trip of the vehicle includes one selected from current location, planned destination, weather conditions, urgency of the trip, presence of other vehicles or people, sensor readings, or whether during the trip the vehicle is computer assisted or autonomously driving.

12. The vehicle of claim 1, wherein the sensor management system in the vehicle includes a processor and a memory, the processor to include a machine learning module to generate an events database, to be stored in the memory, based, at least in part, on past predicted events, and to use, at least in part, data stored in the events database to predict an obstruction or destruction event of the sensors.

13. The vehicle of claim 12, wherein a record for each event stored in the events database includes one or more of: a description of the event, a geographical location of the event, the sensor or sensors affected by the event and a level of hazard to each affected sensor, an area on the vehicle subject to the event, action taken in response to the event, or effect of action taken in response to the event.

14. A computer assisted or autonomous driving vehicle, comprising:

a plurality of sensors;

a sensor management system for use in the vehicle, coupled to the plurality of sensors to predictively maintain effectiveness of the plurality of sensors, based at least in part on identified obstruction or destruction events of the sensors; and a receiver to receive an instruction from a sender external to the vehicle that identifies an obstruction or destruction event of the sensors.

15. The vehicle of claim 14, wherein the sensor management system is further coupled to a navigation system of the vehicle, and the sensor management system, in response to receiving an instruction identifying an obstruction or destruction event of the sensors, is to further change a navigation parameter of the vehicle to avoid the event.

16. The vehicle of claim 15, wherein change a navigation parameter of the vehicle includes one selected from change route, change street, change time of travel, reduce or increase speed, swerve, change lanes, and stop the vehicle in a safe place.

17. The vehicle of claim 14, wherein the sensor management system, in response to receiving an instruction identifying an obstruction or destruction event of a sensor, is to take an action to shield the sensor, or to shield a surface through which the sensor receives a signal, during the event.

18. The vehicle of claim 17, wherein take an action to shield the sensor includes actuate a mechanical device to cover the sensor.

19. The vehicle of claim 14, wherein the instruction is received from another vehicle, or from a cloud computing environment.

20. The vehicle of claim 14, wherein the plurality of sensors includes one or more sets of redundant sensors, and as to each set of redundant sensors:

the sensor management system in the vehicle is to further clean one of the redundant sensors, or to clean a surface through which the sensor receives a signal, when it determines that another of the redundant sensors can perform required sensing tasks.

21. The vehicle of claim 14, wherein the one or more sensors includes one selected from a 2D camera, a 3D camera, a depth camera, a red-green-blue camera, an infrared camera, a passive infrared camera, a microphone, a capacitance sensor, an ultrasonic sensor, a Reed switch or a Hall switch.

22. One or more non-transitory computer-readable media comprising instructions that cause a sensor management system in a vehicle, coupled to a plurality of sensors on the vehicle, in response to execution of the instructions by the sensor management system, to:

predictively maintain effectiveness of the plurality of sensors, based at least in part on predicted cleaning needs of the sensors, predicted obstruction or destruction events of the sensors, or predicted environmental or operating conditions.

23. The one or more non-transitory computer-readable media of claim 22, wherein the sensor management system in the vehicle is further coupled to a navigation system of the vehicle, and wherein the sensor management system, in response to a predicted obstruction or destruction event of the sensors, is further caused to change a navigation parameter of the vehicle to avoid the event.

24. The one or more non-transitory computer-readable media of claim 23, wherein change a navigation parameter of the vehicle includes one selected from change route, change street, change time of travel, reduce or increase speed, swerve, change lanes, and stop the vehicle in a safe place.

25. The one or more non-transitory computer-readable media of claim 22, wherein the plurality of sensors includes one or more sets of redundant sensors, and wherein the sensor management system is further caused to, as to each set of redundant sensors:

clean one of the redundant sensors when it determines that another of the redundant sensors can perform required sensing tasks.

* * * * *